UNITED STATES PATENT OFFICE.

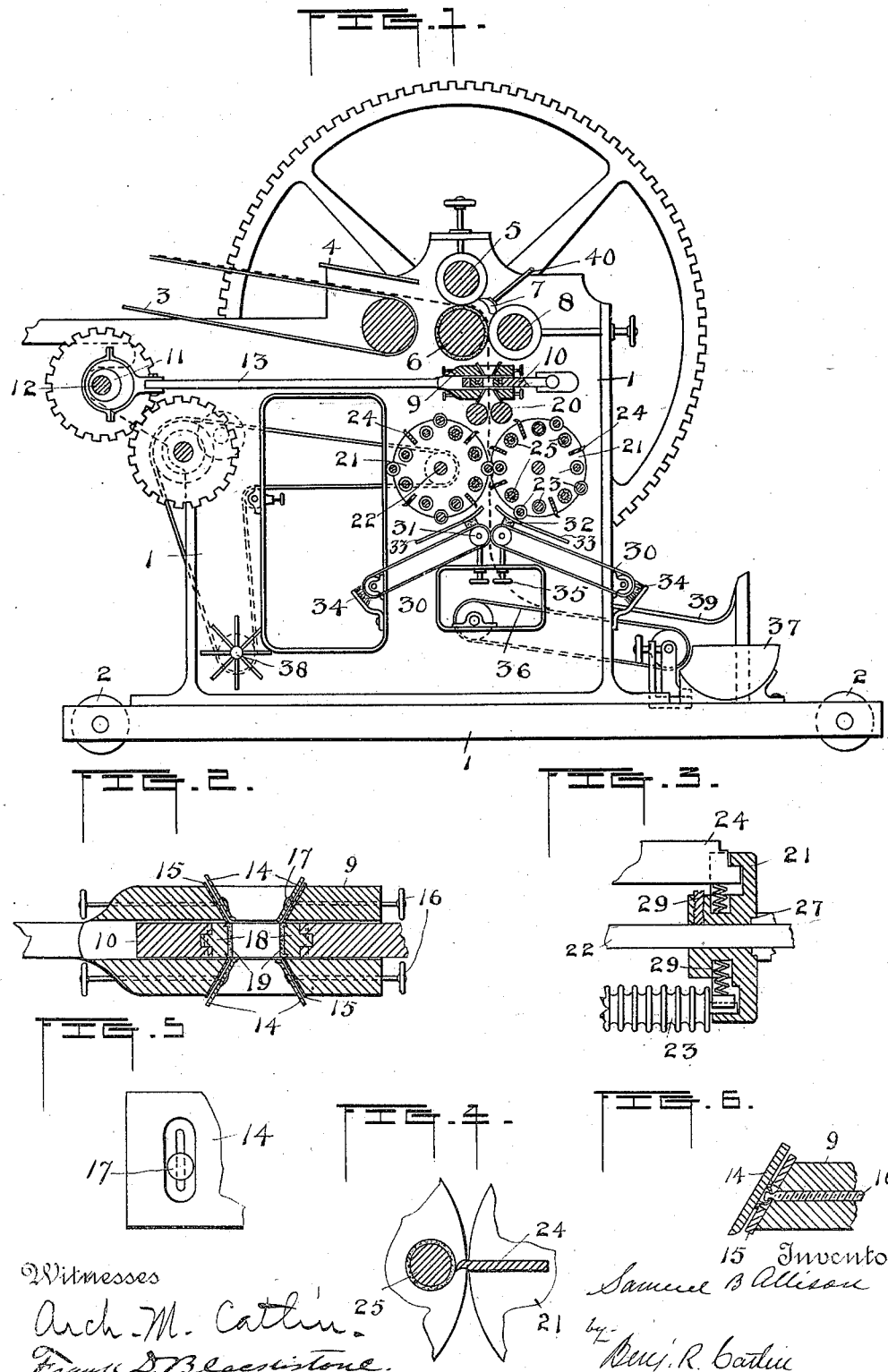

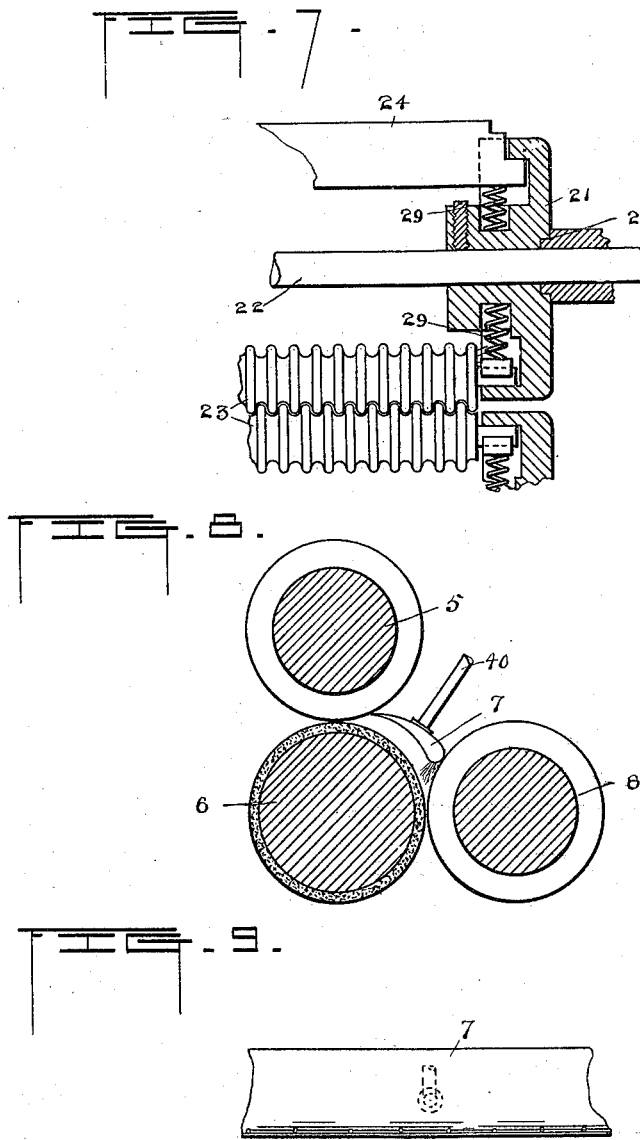

SAMUEL BENJEMAN ALLISON, OF NEW ORLEANS, LOUISIANA.

FIBER-SEPARATING MACHINE.

SPECIFICATION forming part of Letters Patent No. 561,532, dated June 2, 1896.

Application filed November 5, 1894. Serial No. 527,952. (No model.)

*To all whom it may concern:*

Be it known that I, SAMUEL BENJEMAN ALLISON, a resident of New Orleans, in the parish of Orleans and State of Louisiana, have invented certain new and useful Improvements in Fiber-Separating Machines; and I do hereby declare the following to be a full, clear, and exact description of the invention, such as will enable others skilled in the art to which it pertains to make and use the same.

The invention relates to machines for separating and cleaning the fiber of stalks or leaves of plants, and it has for its object to simplify their structure as far as practicably consistent with a high degree of efficiency; and it consists in the construction hereinafter described and particularly pointed out.

In the accompanying drawings, Figure 1 is a partial section, one side of the frame being removed. Fig. 2 is an enlarged partial section of a breaking device. Fig. 3 is a similar view of a skeleton roller supporting fiber-cleaning devices. Fig. 4 is an enlarged sectional detail of a scraping-blade and leather-covered rollers coöperating therewith. Fig. 5 is a partial plan of adjustable fiber-cleaning blades. Fig. 6 is a modified sectional detail. Fig. 7 is a partial elevation of fiber-treating rollers. Fig. 8 is an end elevation of a sprinkling device with rollers shown in section, and Fig. 9 is a partial plan of said sprinkling device.

The improvements relate to fiber-separating machines such as set forth in patent granted to me March 21, 1893, and numbered 493,852, and the various devices described in that patent, including the rotary cleaning-brushes and others, may, if desired, be combined with the improvements which characterize the present invention, and they may also for some purposes be substituted for some of the devices herein set forth without substantial departure from the mechanical and operative principles of the machine.

In the present instance the machine is preferably made portable by means of wheels 2, having axle-bearings in the base of the machine-frame 1, and may be operated by hand or by other power, as found convenient.

3 is a stalk or leaf feeding belt, and 4 a guard to protect the hands of the operator. A circumferentially-grooved roller 5 is combined with a plain roller 6, having a rubber, leather, rawhide, or other elastic compressible covering. The latter is suitable for woody stalks and the rubber for pulpy leaves. The stalks are drawn into the machine and flattened and loosened from their fibrous envelop by the action of the said rubber-covered roller 6, which presses the material against and between the circumferential corrugations or ribs of the opposing roller 5. The material thus partially separated from fiber is guided by a receptacle 7 for liquid, to be more particularly described, down between roller 6 and a circumferentially-grooved roller 8, which crush the woody portions. Below these rollers are breakers 9 and 10, the former of which has two leaves or plates connected by means of a rod 13 to and reciprocated by an eccentric 11 on shaft 12. The reciprocating breaking-plates, which are of usual form, have vertical openings for the passage of the material. Each plate of the two-part breaker 9 is provided on both sides of its opening with a scraping device, consisting of the curved blade 14 and plain blade 15. These are adjustably secured together by means of a longitudinal slot in the curved blade and a screw or bolt 16, passing through the body of the carrier-leaf and provided with a suitable nut 17 adjacent the slot. In the modification shown in Fig. 6, however, the bolt does not pass through plate 14, but has a head engaged by a bent strap or bracket secured to the rear of said plate, as indicated. The blades 15 move in close contact with the edges of the rubber cushions, hereinafter referred to, keeping them clear of gum and particles which might otherwise be lodged between the plates. They also press the sliver sharply against the opposite cushions and scrape it after it has been struck by the edge of a curved blade, which double action is very efficient in separating the wood.

18 denotes removable bars provided with rubber, leather, or rawhide faces or cushions 19. Said bars are made removable to permit the substitution of others having combing teeth or brushes substantially like those set forth in the above-named patent in lieu of the elastic cushions when it is desired to comb or brush dry woody material. In case the elastic faces are employed, as is preferred with pulpy material, when the breaking-plates or one of them is suitably reciprocated the curved scraper removes a part of the refuse and the fiber is then scraped against the rubber or other like facing both at its top and bottom by the plain knives. Below these reciprocating breaker-plates are holding-rollers 20 to press the sliver and partially resist its progress. The use of these particular rollers is not essential in all cases.

Below the holding-rollers are rotating frames or skeleton rollers having heads 21, made fast on shafts 22, and connected by circumferentially-grooved rollers 23, scraping-knives 24, and cushioned rollers 25. These knives and rollers may be made removable to permit the substitution of others. Thus rubber-covered rollers may be substituted for the hide-covered rollers 25 and bars may be substituted for rollers 23, or vice versa. 26 indicates the roller-covering. (See Fig. 4.) These rollers may be journaled in the heads to rotate therein or to be keyed or otherwise secured to the same to act as stationary bars. The heads 21 are provided with exterior flanges or rims 27, overlapping corresponding parts in the journal-boxes of the shafts, thus preventing the fiber from wrapping and clogging the shafts. The rollers 23 are about thirty inches in length and each rib thereon may have a diameter, including that of the body of the roller, of one and one-fourth inch and a thickness of one-sixteenth of an inch. The space between the ribs will be about one-eighth of an inch. In operation the ribs or corrugations of the rollers 23 mesh or overlap, as indicated in Figs. 1 and 4, and have the effect to thoroughly separate, draw, and straighten the sliver without breaking the fiber. The bearings of these rollers are backed by springs 29, which press upon them and tend to retard or prevent their rotating independently of the main or skeleton rollers.

33 indicates curved spring-plates having their proximate edges near the frames and having upper surfaces adjacent the path of the free edges of the knives or blades 24 when passing downwardly and away from the said vertical plane. These springs and bearings will also yield when necessary for the passage of the sliver between the rollers. As the ribs or corrugations are comparatively small in width or thickness, with deep interspaces, which provide for a close intermeshing of said ribs, the sliver will be separated thereby into many portions, which will be subjected to a drawing action favorable for straightening and cleaning the fiber, the springs providing that the rollers may move apart and rotate more readily to prevent obstruction or breaking of the fibers, the action being less injurious than the blows of revolving comb-teeth of usual form. The said rollers are provided with bearings in each of the two pairs of heads 21, situated alternately at different distances from the peripheries of the heads of each pair, and the two pairs of heads and their respective rollers are relatively arranged, as shown, so that the corrugations of the rollers may mesh, so as to give a zigzag course to the sliver as it passes between them and so as to guide it across the edge of the knife 24, situated above the rollers in operation, and hold it against the edge of the knife 24 below, as indicated in the drawings. The cushioned rollers or bars 25 are arranged, as shown, to sustain the sliver against the scraping blow of oppositely-placed knives as they pass from above to below the horizontal diameter of the skeleton rollers.

The knives 24 are held in recesses in the heads and preferably pressed outward by springs 29. The action of the springs 29, combined with that of the compressible elastic opposing-cushions 26, tends to prolong the scraping action of the knives and obviates the cutting or breaking of the fiber.

Immediately below the devices just described are two endless gumming-belts 30. These are driven by rollers 31 with a surface speed greater than that of the feeding-rollers above, in order to secure a rubbing action on the fiber.

32 denotes rubber-brushing or gum-clearing devices attached to the curved spring-plates 33 and bearing on the belts.

34 are belt-cleaning brushes.

35 are set-screws for the bearing-boxes (not shown) of rollers 31.

The action below the central planes of the skeleton rollers is such that the sliver is alternately thrown from side to side and the rear end of the fibers whipped against the edges of the curved blades.

36 denotes a carrying-off belt, and 37 a washing-tank, which is especially useful when green material is treated.

38 indicates a fan, and 39 a chute for refuse.

All the parts herein described are or may be provided with any suitable means of adjustment to enable their action to be adapted to various materials or to various conditions, and the representation is not intended to exactly indicate sizes or distances.

I usually leave about one thirty-second of an inch between the adjacent surfaces of the crushing or splitting rollers, which rollers may each have a diameter of about ten inches. The reciprocating blade-carriers are preferably placed about an inch from the lower crushing-rollers. The radial distance from the center of the skeleton rollers to the working surface of the ribbed rollers or cushions may be four or more inches. I have found that these skeleton rollers may in some cases be rotated six hundred times per minute. The surface speed of the gumming-belts is advantageously made greater than that of the material and that of the carrying-off belt greater than that of the gumming-belts to give a buffing or rubbing action on the sliver.

Fiber-bearing stalks or plants in some cases require, for the best results, to be moistened during the operation above described either with pure water or chemical solutions.

40 indicates a supply-pipe for a device for sprinkling liquid upon the material. This has a liquid-receiving chamber, and its inner concave face has numerous perforations arranged, preferably, near its bottom part to equably distribute the liquid by pressure transmitted through the supply-pipe. For this equal distribution the perforations may be suitably varied in size and relative distance. The perforated face of the sprinkling-receptacle is made concave to act as a guide for the material passing between the rollers 5 and 6, and its upper edge is situated near the former and its lower edge near roller 8. This stalk guiding and sprinkling device is situated directly over the vertical path of the material, whereby the liquid falls by gravity in said path and not upon the machinery frame or floor at one side of said path.

Having thus described my invention, what I claim is—

1. In a machine for treating fibrous plants for separating the fiber, the combination of the hollow liquid-receptacle having a smooth entire concave surface, rollers 5 and 6 situated one below and adjacent to the other, roller 8 situated adjacent to and at the side of roller 6, means for feeding fiber to said rollers, said receptacle having an edge near each of the rollers 5 and 8 and being continuous with the length of the same and having perforations at its lower edge near the space between the lower rollers, all substantially as set forth whereby the direction of the fiber is changed from the horizontal to the vertical and whereby it is sprinkled in its vertical path through the machine.

2. In a machine for treating fibrous plants to separate the fiber, grooved roller 5 and covered roller 6 for splitting the stalk, a roller 8 situated at the side of roller 6, breaking and cleaning plates 9 and 10 and an eccentric for suitably moving the plates 9, devices for scraping the sliver situated vertically below the plates, a hollow guide 7 continuous from end to end of the rollers 5, 6 and 8 and having an upper edge near roller 5 and discharge-openings at its lower edge only, and a liquid-supply pipe, said discharge-openings being situated immediately over the vertical path of the sliver between the latter rollers and through the breaking and cleaning plates and scraping devices, substantially as set forth.

3. In a machine for treating fibrous plants to separate the fiber, rollers 5 and 6 situated one above the other and adapted to act upon the material, a roller 8 situated at the side of roller 6 and a hollow liquid-receptacle and guide 7 having a concave guiding-face and corresponding in length with and situated between the rollers 5 and 8 and in the path of the material and adapted to direct it downwardly, said receptacle being provided with perforations on its lower edge to discharge liquid upon the material as it passes between said rollers, and devices situated directly below the rollers for clearing and scraping the moistened fiber, substantially as set forth.

4. In a machine for separating fiber the breaker-plates 9 and 10 having vertical holes for the passage of the material the plates 9 being provided with blades 14 and 15 having their edges near the horizontal plane between said plates 9 and 10, elastic cushions 19 secured to plate 10 and situated near the path of the said blades and means for reciprocating one of the plates, substantially as set forth.

5. In combination, the rotating cylindrical frames, means for introducing fibrous material into the machine, blades 24 carried by said frames to strike the material, plates 33 upwardly curved toward the path of said blades and situated with their proximate edges near a vertical plane between the frames and with their upper surfaces adjacent the path of each of said blades when passing downwardly and away from said plane and rollers 31 to draw the material down, all substantially as set forth whereby said material is moved through the machine and the rear ends of the fibers are whipped outwardly and drawn across the edges of said curved plates.

6. In a machine for treating fiber the combination of fiber-moving rollers with belt-rollers and with the belts 30, said first-named rollers being situated above the belt-rollers and said belts bearing oppositely on the sliver, and with the belt-cleaning brushes pressing on the belts opposite its rollers, substantially as set forth.

7. The combination of the skeleton rollers or frames, the rollers 23 carried thereby, said rollers in each frame coöperating with those in the other and acting simultaneously on opposite sides of the sliver, the upwardly-curved blades 33, the brushes 32 fixed to the bottom of said blades and the endless gumming-belts for rubbing the sliver on opposite sides and drawing it through between said rollers 23, substantially as set forth.

8. In a machine for treating plants to separate fiber, the rotating frames or skeleton rollers having heads, each frame provided with circumferentially ribbed or corrugated rollers 23 journaled in said heads and provided also with movable spring-supported bearings for said rollers, the ribs of the rollers on one frame closely meshing with those of corresponding rollers of an opposite frame to separate, straighten and draw the sliver when the frames are rotated and means for rotating the said frames, substantially as set forth.

9. In a machine for treating plants to separate fiber, the rotating frames or skeleton rollers each having heads supporting ribbed rollers 23 journaled in said heads, said ribbed rollers being situated alternately at different distances from the peripheries of the heads in each frame and the ribs of each outermost roller of each frame meshing with the ribs of an innermost roller on the opposite frame when suitably rotated, substantially as set forth.

10. In a machine for treating plants to separate fiber, the rotating frames or skeleton rollers each having heads supporting ribbed rollers 23 journaled in said heads, said ribbed rollers being situated alternately at different distances from the periphery of the heads in each frame and the ribs of each outermost roller of each frame meshing with the ribs of an innermost roller on the opposite frame when suitably rotated to separate, straighten and draw the sliver, the knives 24 and cushioned rollers 25, the knives and cushioned rollers being situated at corresponding points in the heads and simultaneously acting on the sliver, substantially as set forth.

In testimony whereof I have signed this specification in the presence of two subscribing witnesses.

SAMUEL BENJEMAN ALLISON.

Witnesses:
    CHAS. E. DIVMEYER, Jr.,
    CHAS. CUMMINGS.